Sept. 12, 1967     L. S. KONGABLE     3,341,764
ELECTRONIC SYSTEM
Filed July 20, 1964
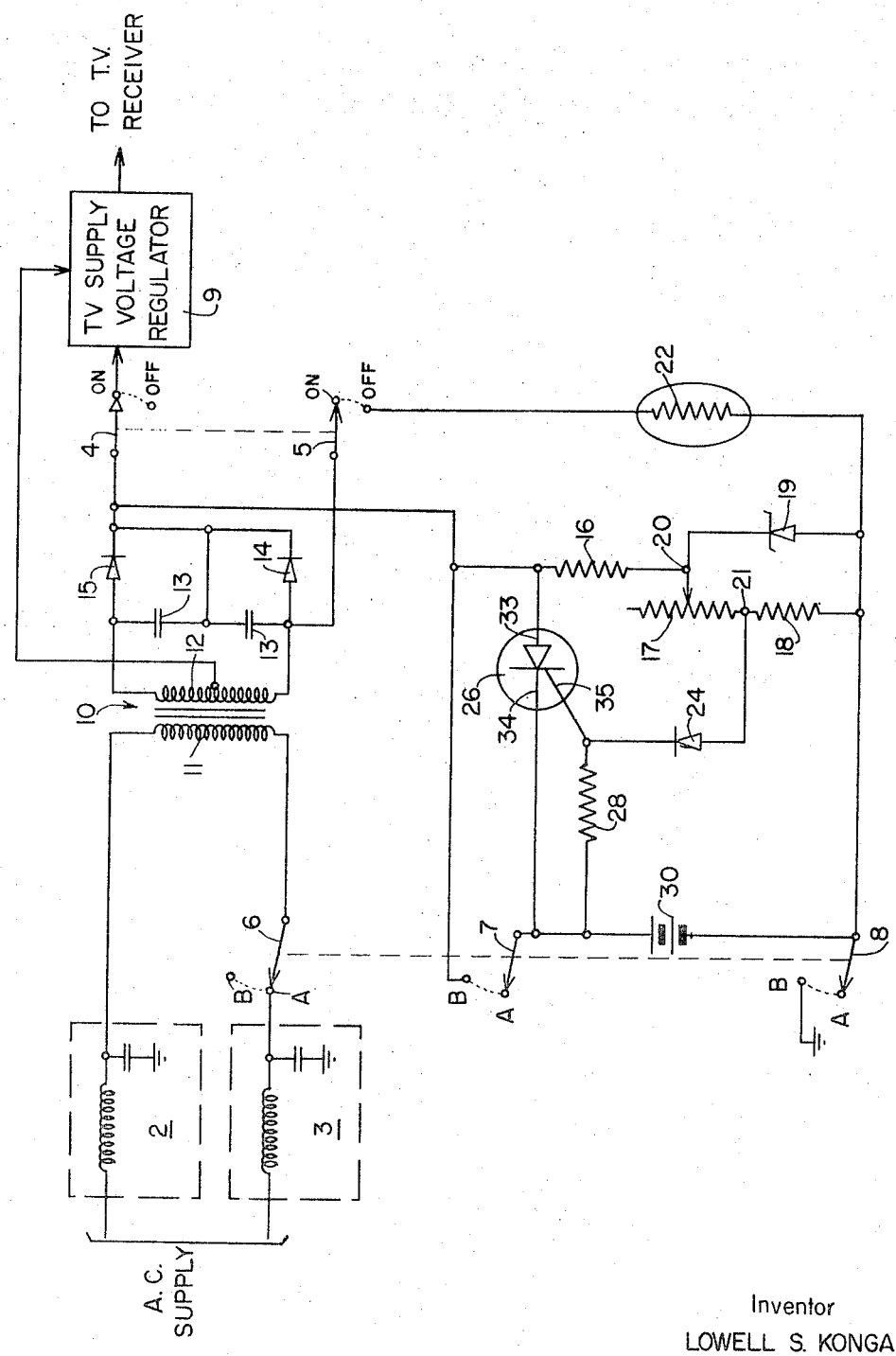
Inventor
LOWELL S. KONGABLE
By
Moeller & Aichele
Attys.

United States Patent Office 3,341,764
Patented Sept. 12, 1967

3,341,764
ELECTRONIC SYSTEM
Lowell S. Kongable, Prospect Heights, Ill., assignor to Motorola, Inc., Franklin Park, Ill., a corporation of Illinois
Filed July 20, 1964, Ser. No. 383,843
2 Claims. (Cl. 320—59)

This invention relates to a regulating circuit for controlling the charging current supplied to a storage battery, and in particular to a charging circuit for a storage battery as may be used in a portable transistorized television receiver.

With the increased use of transistors in electronic apparatus it has become possible to construct consumer type entertainment apparatus, such as a television set, in a portable battery operated form. The battery used should preferably be rechargeable from the household supply voltage. Furthermore, the television user should not be required to control or adjust the charging operation, and charging should stop automatically when the storage battery is fully charged. The charging rate should also be automatically limited to prevent damage to the battery.

It is an object of this invention to provide an improved automatic battery charging circuit for a battery operated electronic device, such as a television receiver.

Another object of this invention is to provide a battery operated electronic device with a battery charging circuit which automatically regulates the battery charging rate without attention by the user.

Another object of this invention is to provide a battery operated electronic device wtih a battery charging circuit which automatically stops the charging current when the storage battery has reached full charge.

A feature of this invention is the provision of a battery charging circuit with a silicon controlled rectifier circuit controlled by a pulsating direct current control voltage, to supply charging current to the battery until it is fully charged.

Another feature of this invention is the provision of a battery charging circuit with a positive temperature coefficient resistance to limit the current supplied to the battery during charging.

Another feature of this invention is the provision of a battery charging circuit with a voltage regulating circuit to provide a pulsating direct current control voltage having a magnitude independent of power line voltage fluctuations.

The invention is illustrated in the drawing which is a schematic representation of the battery charging circuit.

In practicing this invention a portable battery operated television set is provided with a storage battery charging circuit including a silicon controlled rectifier (SCR). The control electrode of the SCR is coupled to a control voltage supply, the cathode electrode is coupled to the battery and the anode is coupled to a battery charging supply. The control voltage supply produces a pulsating direct current voltage, the peak magnitude of which determines the end charging voltage of the battery. When the pulsating control voltage reaches a magnitude slightly greater than the battery voltage the SCR is turned on thus connecting the battery to the direct current battery charging supply and allowing charging current to flow to the battery. A positive temperature coefficient resistor is included in series with the battery and the direct current charging supply to limit the current supplied to the battery and thus the charging rate. In addition a zener regulator is provided to regulate the control voltage at a desired value so that the peak value of the control voltage will be relatively independent of fluctuations in the supply voltage.

Referring to the drawing, a power supply for a television receiver operated from a household supply or a battery is shown. The primary 11 of transformer 10 is coupled to a source of alternating current voltage through line filters 2 and 3. The secondary winding 12 is coupled to diodes 14 and 15 and to regulator 9. Capacitors 13 provide filtering for the alternating current supply. The output of diodes 14 and 15 is a pulsating direct current which is coupled to the television supply voltage regulator 9 through on-off switch 4.

When the line cord connecting the television receiver to the alternating current supply is attached to the set, switches 6, 7 and 8 are in position A and the set may be operated from the alternating current supply or battery 30 may be charged. When the line cord is disconnected from the television receiver, switches 6, 7 and 8 are in position B. In this arrangement switch 8 connects battery 30 to ground while switch 7 connects battery 30 to the television supply voltage regulator 9 through on-off switch 4. The television receiver may thus be operated for a period determined by the energy stored in battery 30. When the line cord is removed switch 6 disconnects the AC supply circuit from transformer 10.

When the line cord is attached to the television receiver and the on-off switches 4 and 5 are in the off position a charging current is supplied to battery 30. One terminal of secondary winding 12 of transformer 10 is coupled through on-off switch 5 and positive temperature coefficient resistor 22 to the negative terminal of battery 30. The other terminal of secondary winding 12 is coupled to the battery through diode 15 and the charging circuit. The direct current supply for the television receiver is connected as a half-wave rectifier for charging battery 30, and the output voltage supplied is taken across the entire winding 12 and thus is greater than the full wave voltage supplied when operating from the alternating current line.

The pulsating direct current output from diode 15 is applied to a voltage regulator in the charging circuit consisting of resistor 16 and zener diode 19. Zener diode 19 limits the peak magnitude of the pulsating direct current voltage appearing at point 20 to a predetermined value. Point 20 is coupled to an adjustable voltage divider consisting of variable resistor 17 and resistor 18. By adjusting the value of variable resistor 17, the peak value of the pulsating voltage appearing at point 21 can be controlled. The voltage appearing at point 21 is the control voltage, used to regulate the end charging voltage of the battery, and is coupled to the control electrode 35 of SCR 26 through diode 24. Diode 24 acts to decouple the battery 30 from the control voltage supply. The zener diode regulator thus prevents fluctuations in the control voltage with fluctuations in the supply voltage.

A storage battery 30 is coupled to cathode 34 of SCR 26 and to the reference side of transformer winding 12 through positive temperature coefficient resistor 22. The resistance of resistor 22 increases as the current to battery 30 increases and thus resistor 22 acts to limit the charging current to the battery. A resistor 28 is coupled between cathode 34 and control electrode 35 of SCR 26 to limit the reverse bias between control electrode 35 and cathode 34 when SCR 26 is biased off.

In operation, SCR 26 is biased off until the voltage applied to the anode 33 is positive with respect to that applied to cathode 34 and the voltage applied to control electrode 35 is also positive with respect to the voltage applied to cathode 34. A positive pulsating direct current voltage produced by diode 15 is applied to both anode 33 of SCR 26 and the voltage regulator consisting of resistor 16 and zener diode 19. The regulated pulsating direct current voltage at point 20 is divided down and applied to the control electrode 35 as the control voltage. When the pulsating control voltage applied to control electrode 35 becomes slightly more positive than the voltage from battery 30, the SCR is biased on, and current will flow from the direct current supply to battery 30 through SCR 26 thus charging battery 30.

By adjusting the control voltage applied to control electrode 35 so that the peak value of the control voltage is equal to the desired end voltage of the battery, the battery will not be charged to a voltage higher than the end voltage. When the voltage of battery 30 increases to a magnitude where it is slightly less than the peak value of the control voltage, SCR 26 will not be biased on and no charging current will be supplied to battery 30. Thus the charging circuit automatically stops supplying the charging current to the battery when its voltage has reached the desired end value.

The following is an example of component values which have produced good results in a circuit of this type.

| | |
|---|---|
| Resistor 16 | 1000 ohms. |
| Resistor 17 | 350 ohms (variable). |
| Resistor 18 | 1200 ohms. |
| Resistor 22 | 4.9 ohms cold (PTC). |
| Resistor 28 | 1000 ohms. |
| CR 15 | 1N1219. |
| CR 24 | 1N1169. |
| CR 19 | 1N3031A. |
| SCR 26 | TI40A2. |

Thus a simple circuit has been shown for controlling the charging rate and end voltage of a storage battery. The circuit is automatic in operation and no control is necessary by the user.

I claim:

1. An electrical system for charging a storage battery from a pulsating direct current supply, including in combination, a silicon controlled rectifier having an input electrode for coupling to the direct current supply, an output electrode for coupling to one terminal of the storage battery and a control electrode, reference potential means for coupling to the other terminal of the storage battery, fixed resistance means coupled between said output electrode and said control electrode, regulating means for providing a regulated pulsating direct current voltage having a maximum peak value equal to a first predetermined magnitude and including further resistance means connected to the direct current supply, and zener diode means connected between said further resistance means and said reference potential means, adjustable voltage divider means coupled in parallel with said zener diode means and being responsive to said regulated pulsating direct current to develop a regulated control voltage having a peak value equal to a second predetermined magnitude, passive circuit means coupling said adjustable voltage divider means to said control electrode for applying said regulated control voltage thereto, said silicon controlled rectifier being responsive to said regulated control voltage at said input electrode thereof and a battery voltage at said output electrode less than second predetermined magnitude to provide a charging current for the battery.

2. An electrical system for charging a storage battery from a pulsating direct current supply, including in combination, a silicon controlled rectifier having an input electrode coupled to the pulsating direct current supply, an output electrode coupled to the storage battery and a control electrode, regulating means for providing a regulated pulsating direct current voltage having a maximum peak value equal to a first predetermined magnitude and including resistance means coupled to the direct current supply and zener diode means coupled between said resistance means and a reference potential, adjustable voltage divider means coupled between said resistance means and said reference potential and being responsive to said regulated pulsating direct current to develop a control voltage having a peak value equal to a second predetermined magnitude, diode means coupling said adjustable voltage divider means to said control electrode, resistance means coupling said control electrode to said output electrode, circuit means including current limiting means coupling the direct current supply to said reference potential, and circuit means coupling the battery to said reference potential, said silicon controlled rectifier being responsive to said control voltage and a battery voltage less than said second predeterimned magnitude to provide a charging current for the battery.

References Cited

UNITED STATES PATENTS

| | | | |
|---|---|---|---|
| 3,009,091 | 11/1961 | Hallidy | 322—28 |
| 3,018,432 | 1/1962 | Palmer | 323—66 |
| 3,025,455 | 3/1962 | Jonsson | 320—35 X |
| 3,160,805 | 12/1964 | Lawson | 320—39 |
| 3,171,076 | 2/1965 | Medlar | 320—35 X |
| 3,223,913 | 12/1965 | Kalns et al. | 320—39 |

JOHN F. COUCH, *Primary Examiner.*

S. WEINBERG, *Assistant Examiner.*